June 30, 1970  A. I. ARNELO  3,518,533

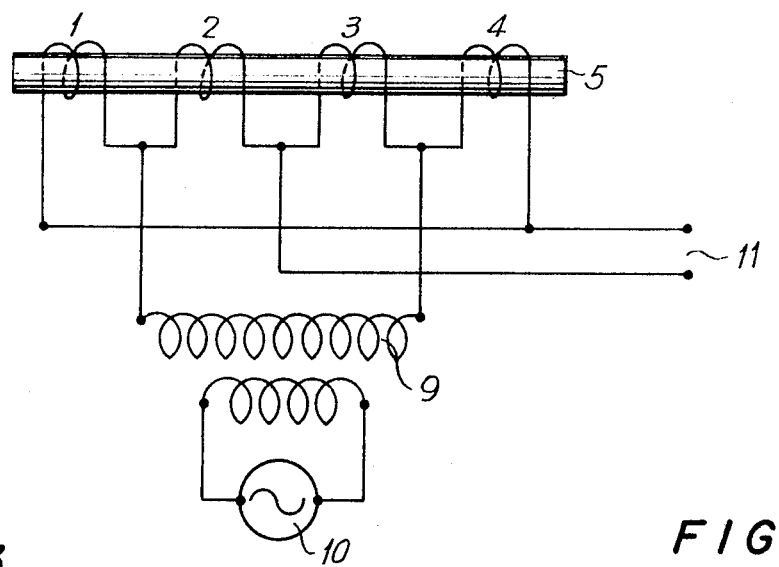
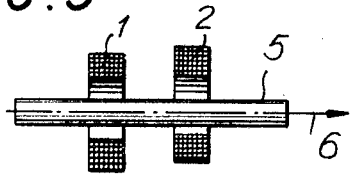
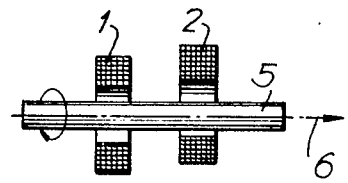
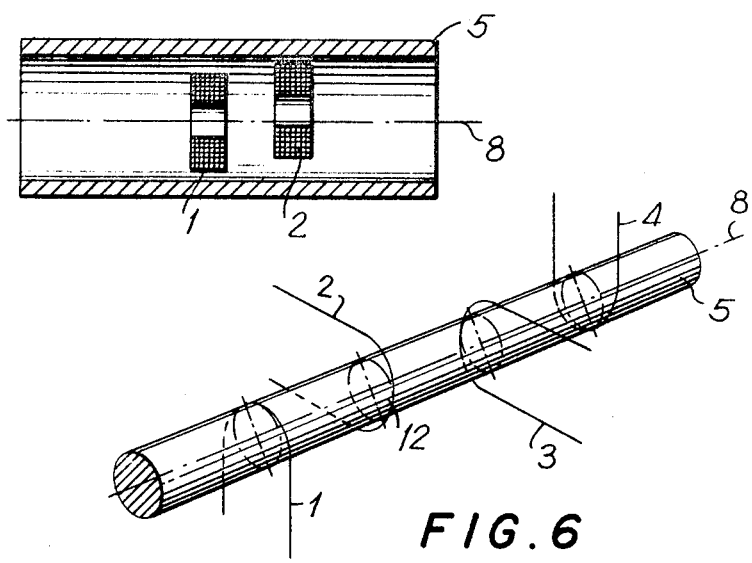

ELECTROINDUCTIVE SENSING DEVICE WITH ADJUSTABLE COIL

Filed Jan. 20, 1967  4 Sheets-Sheet 4

United States Patent Office 3,518,533
Patented June 30, 1970

3,518,533
ELECTROINDUCTIVE SENSING DEVICE WITH ADJUSTABLE COIL
Anders Ingvar Arnelo, Vasteras, Sweden, assignor to Essem Metotest AB, Skultuna, Sweden
Filed Jan. 20, 1967, Ser. No. 610,511
Claims priority, application Sweden, Feb. 14, 1966, 1,862/66
Int. Cl. G01r 33/12
U.S. Cl. 324—40        1 Claim

ABSTRACT OF THE DISCLOSURE

A system of probe coils for the non-destructive electroinductive testing of materials wherein the material to be tested is moved in the axial direction of the coils or the coils are moved in the axial direction of the material, in such a way that the electrical characteristics of the coils vary as a function of the properties of the material, the variations of said electrical characteristics being measured for the purpose of determination of said properties; some of the coils are centered about individual non-coincident axes; the coils are surrounded by the material or the material is surrounded by the coils.

---

The present invention relates to an electroinductive sensing device for eddy currents induced in material under relative movement, in the axial direction of the induction coil system, between the material and the sensing device.

It is known in the non-destructive testing of materials to utilize so called "electroinductive" testing. In this context the material to be tested is passed between a coil which is connected to a source of alternating current. An electromagnetic field is formed in the coil and when the force lines of the field cut the test piece eddy currents appear in the same which react on the coil and its electrical properties so that these vary as a function of the eddy currents in the sample material, which in turn vary, depending on the different properties of the said sample material. By measuring the electrical data of the coil it is thus possible to check the properties of the sample material. Since, however, the variations in the property of the coil are very small in themselves the coil must be included in a bridge or compensation circuit of some arbitrary type and the unbalanced voltage obtained from the bridge must be greatly amplified so that said variations can be indicated. Such bridge circuits are previously known per se and do not constitute a part of the invention proper, and consequently will not be described in detail. A suitable embodiment of such bridge circuits is described, for instance, in the Swedish Pat. 179,407 and on pages 92 and 93 in "Progress in Non-destructive Testing," vol. 1, Heywood & Company Stanford and J. H. Fearon, vol. 1, Heywood & Company Limited, London, 1958. Electromagnetic testing of material is taken up in more detail in the section "Electromagnetic methods of testing metals" (pages 59-109) in the same book.

The known bridge circuits are provided with one or, at the most, two active branches, i.e. branches which include a coil possessing the aforementioned properties. In the case of the present invention, however, it is preferred to allow more than two branches to include such an active coil, since in this way it is possible to adapt the coil system to the sample material undergoing the test.

The magnitude and extension of the eddy currents are influenced by a large number of different factors, i.e. the coupling between coil and test sample, which depends on the distance from the turns of the coil to the sample material. Other factors are the shape of the sample, its conductivity and its magnetic properties. When testing material for faults by means of the electroinductive method it is therefore important to eliminate the effects of all factors other than those which are connected with the faults in the material. For this purpose it is necessary, among other things, to adjust the coupling factors to the samples in question or, in other words, to adjust the dimensions of the coil to the dimensions of the sample material. This means that according to the known technique one is forced to use coils of different dimensions for testing material of different dimensions. When testing, for instance, rod material of different cross-section and different dimensions it is thus necessary to use a large number of coils of different types. This is obviously an economic problem which could be avoided if one and the same sensor could be used for testing material of different dimensions. The invention is intended to make this possible.

An electroinductive probe according to the invention is mainly characterized in that the induction coil system comprises at least two coils positioned one after the other in the axial direction and capable of being adjusted relative to each other transversely to said direction.

Additional characteristics of the invention are evident from the claim.

The invention will be described more closely with reference to an embodiment of an electroinductive sensor shown in the accompanying drawing.

FIG. 2 shows a wiring diagram for an electric circuit, in which the probe means according to the invention is connected.

FIGS. 3 and 4 illustrate the relative movement carried out between probe and sample material, as well as showing additional examples of probe coils surrounding the sample material whilst such mechanical means as the previously mentioned adjusting means for the coils are omitted.

FIG. 5 shows the sample material surrounded by probe coils.

FIGS. 6 to 10 show various forms of sample material with probe coils adapted thereto.

Figure 1:
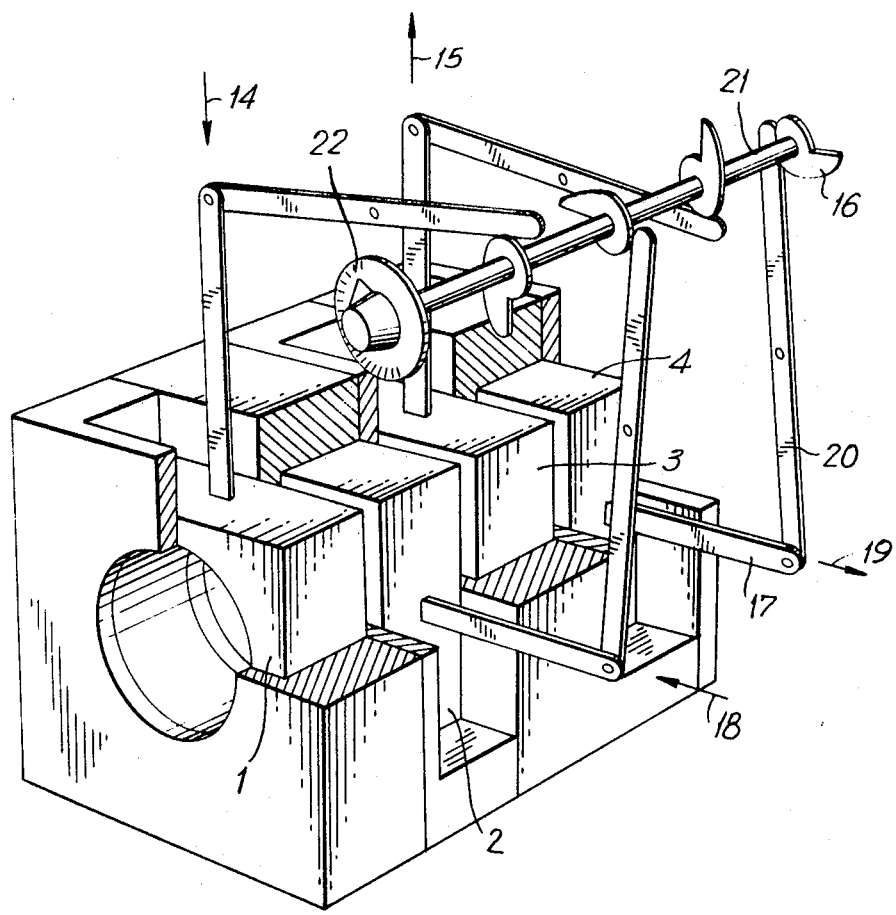
FIG. 1 shows diagrammatically an embodiment of an electroinductive probe means according to the invention, provided with adjusting means for the induction coils included in the same.

The induction coil system in FIG. 1 is provided with four coils 1, 2, 3 and 4 each arranged to be displaced in four directions on actuation of respective holders in different directions on actuation of an operating wheel 22. The wheel 22 is secured to a shaft 21 which is provided with four identical cams 16 arranged with a mutual displacement of 90° on the shaft 21. Each cam 16 abuts one end of a rod 20, the other end of which is pivotally connected to a second rod 17. Each coil 1, 2, 3, 4 is securely connected to a rod 17.

As shown in the embodiment of FIG. 1, the coil 1 moves downwards in the direction of arrow 14, the coil 2 to the 3 upwards in the direction of arrow 15, the coil 2 to the left in the direction of arrow 18 and the coil 4 to the right in the direction of arrow 19.

The passage located in the induction coil system for passage of the test piece therethrough will obviously decrease from the maximum opening shown in the drawing when the wheel 22 is actuated to move the coils in the direction of arrows 14, 15, 18, 19. The induction coil system can thus be adjusted to test pieces of different cross-sectional area.

In the wiring diagram of FIG. 2, there is shown a test piece 5 with the coils 1, 2, 3, 4 arranged in sequence therearound. Alternating current is supplied from a voltage source 10 via a transformer 9 to two corners of bridge and an unbalanced signal is taken out from the two remaining corners on the output terminals 11 when, for instance, the electric properties are different in the portions of the test piece 5 sensed by the separate coils 1, 2, 3, 4 at a particular time. This signal can be used to actuate an indicating means which colors the faulty part of the material.

FIG. 3 shows an example where the coils 1, 2 are stationary while rod material 5 to be tested are fed, for example, from a rolling mill and thereby is displaced at right angles to the plane of the coils 1, 2 in the direction of arrow 6. FIG. 4 illustrates an example where the test piece shown as a rod is driven by appropriate mechanical driving means through the coils in a helical movement represented by the arrows 6, i.e. a helical sensing of the test piece is effected. Conversely, the coils 1, 2 may be displaced and/or rotated by appropriate mechanical driving means while the test piece 5 remains stationary. FIGS. 3 and 4 show the test piece 5 surrounded by the coils.

FIG. 5 shows two coils 1, 2 surrounded by the test piece 5, which in this case is a tube with its center along the line 8. The coils 1, 2 can be displaced or effect a rotational movement relative to the test piece 5 or the test piece 5 can be moved relative to the coils 1, 2.

Figure 7:
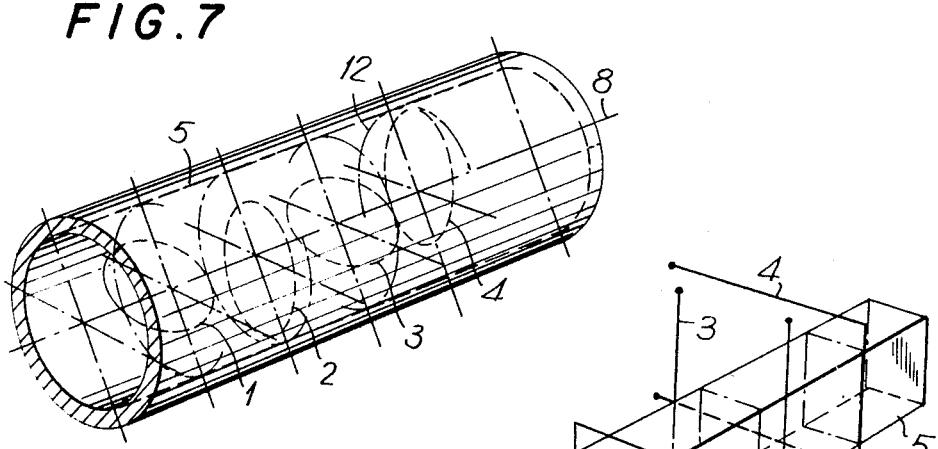
Figure 8:
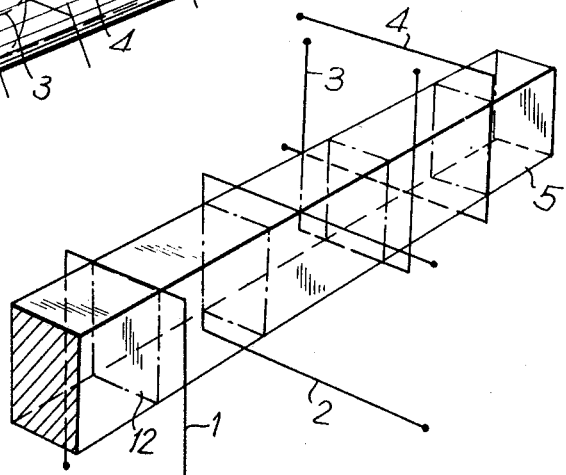
Figure 9:
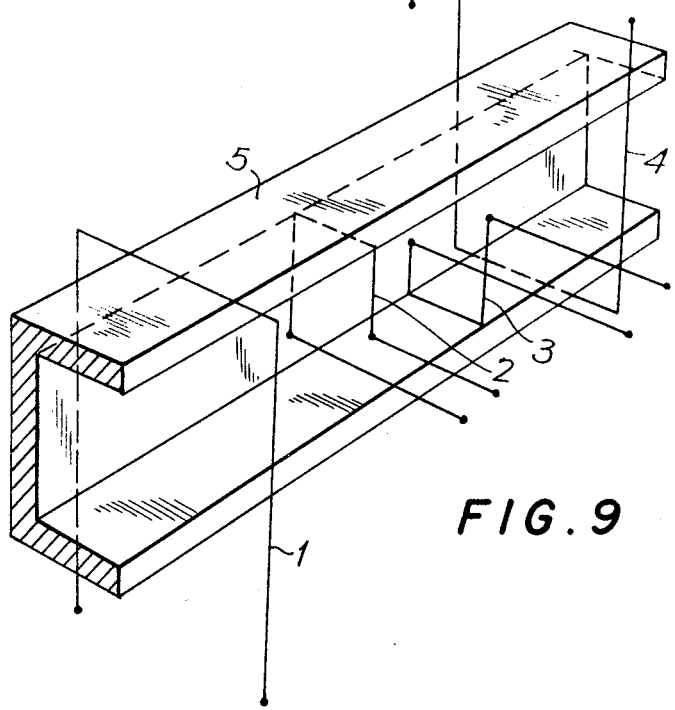
Figure 10:
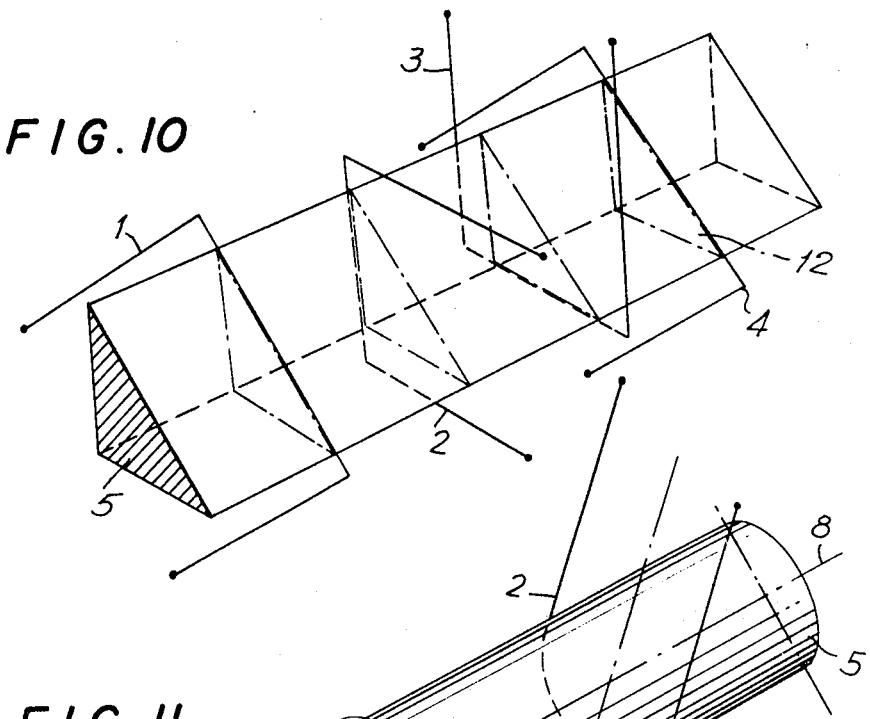

FIGS. 6–10 illustrate embodiments of the coils 1, 2, 3, 4 shown as single turns of wire and their positioning at different sections of the test piece 5. The coils 1, 2, 3, 4 are positioned in plane 12 at right angles to the longitudinal axis 8 of the test piece. FIG. 6 shows the test piece in the form of a rod, FIG. 7 shows the test piece in tubular form. FIG. 8 shows the test piece of square cross-section, FIG. 9 shows the test piece of U-shaped cross-section, FIG. 10 shows the application of the sensing device of the invention to a test piece of triangular cross-section which, for instance, presents one angle of 120°. The electroinductive sensing device may thereby be provided with an odd number of adjustable coils, an additional but stationary coil being arranged in a plane perpendicular to the axial direction. FIG. 9 shows an example having two coils 1, 4 for externally sensing the test piece and two coils 2, 3 for sensing the test piece internally. The inner and outer coils can also be used in the case of tubular test pieces, as shown in FIG. 7.

Figure 11:
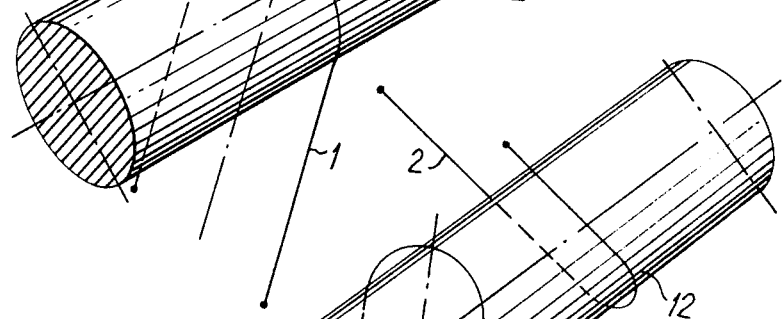
FIGS. 11 and 12 illustrate examples where the planes of movement of the probe coils form angles other than 90° with axial direction of the sample material (advancing direction).
Figure 12:
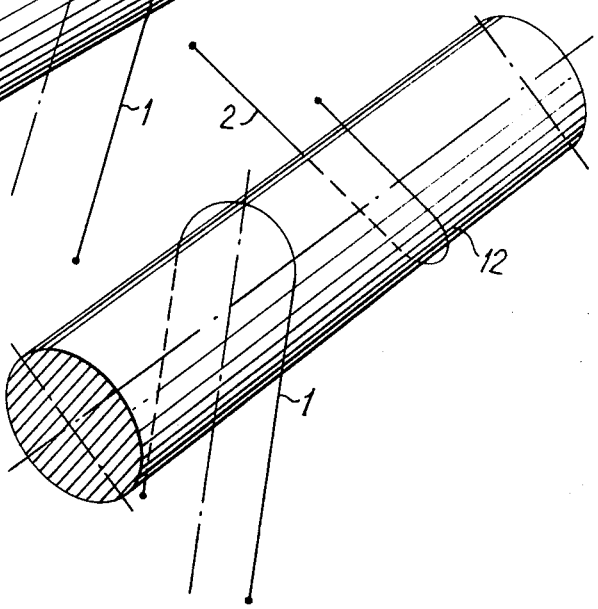

FIG. 11 shows two coils 1, 2 lying in planes which form certain angles to the planes 12 at right angles to the longitudinal axis 8 of the test piece 5. The planes of these coils 1 and 2 are mutually parallel. FIG. 12 shows how said planes for the coils 1, 2 are also capable of forming a certain angle to each other.

The arrangements illustrated in FIGS. 6 to 12 may have adjusting means as the arrangement of FIG. 1. In the arrangements of FIGS. 3 to 5, which have only two coils, the mutually eccentric positions of the coils are adapted to the dimensions of a certain test piece. In such case, according to the invention, the coils may be fixed in position in relation to each other, which means that the coil arrangement can be manufactured to assume such fixed positions.

The invention is not restricted to the described embodiments which are intended for non-magnetic test pieces, but can also be adapted with magnetic test pieces, providing that the test piece is magnetically saturated.

What is claimed is:

1. An electroinductive sensing device for use in determining the properties of a piece of material to be tested during its movement relative to an induction coil system, comprising at least two coils, individually encircling said test piece and having their axes parallel to the longitudinal axis of said test piece and being positioned the one after the other in the longitudinal direction of said test piece, whereby during such movement the electrical characteristics of said coils vary in response to the properties of said test piece, said device further comprising a measuring means connected to said coil system for measuring the variations in said electrical characteristics, and adjusting means cooperating with at least one of said coils to offset the same, prior to the use of said sensing device, from the other coils in a direction transverse to said longitudinal direction and maintaining said coil in said adjusted position during the measuring.

References Cited

UNITED STATES PATENTS

| | | | |
|---|---|---|---|
| 1,129,584 | 2/1915 | Murphy | 324—37 |
| 2,267,884 | 12/1941 | Zuschlag | 324—40 |
| 2,337,352 | 12/1943 | Sitterson et al. | 324—41 |
| 2,882,488 | 4/1959 | Price et al. | 324—37 |
| 2,124,579 | 7/1938 | Knerr et al. | 324—37 X |
| 2,435,985 | 2/1948 | Stewart et al. | 324—34 |
| 3,299,350 | 1/1967 | Tompkins et al. | 324—37 |

FOREIGN PATENTS 827,527  2/1960  Great Britain.

ALFRED E. SMITH, Primary Examiner

U.S. Cl. X.R.

324—37